June 3, 1930.  W. C. FRICK  1,761,984
MECHANISM FOR SALVAGING TIN CANS
Filed April 4, 1927  3 Sheets-Sheet 1
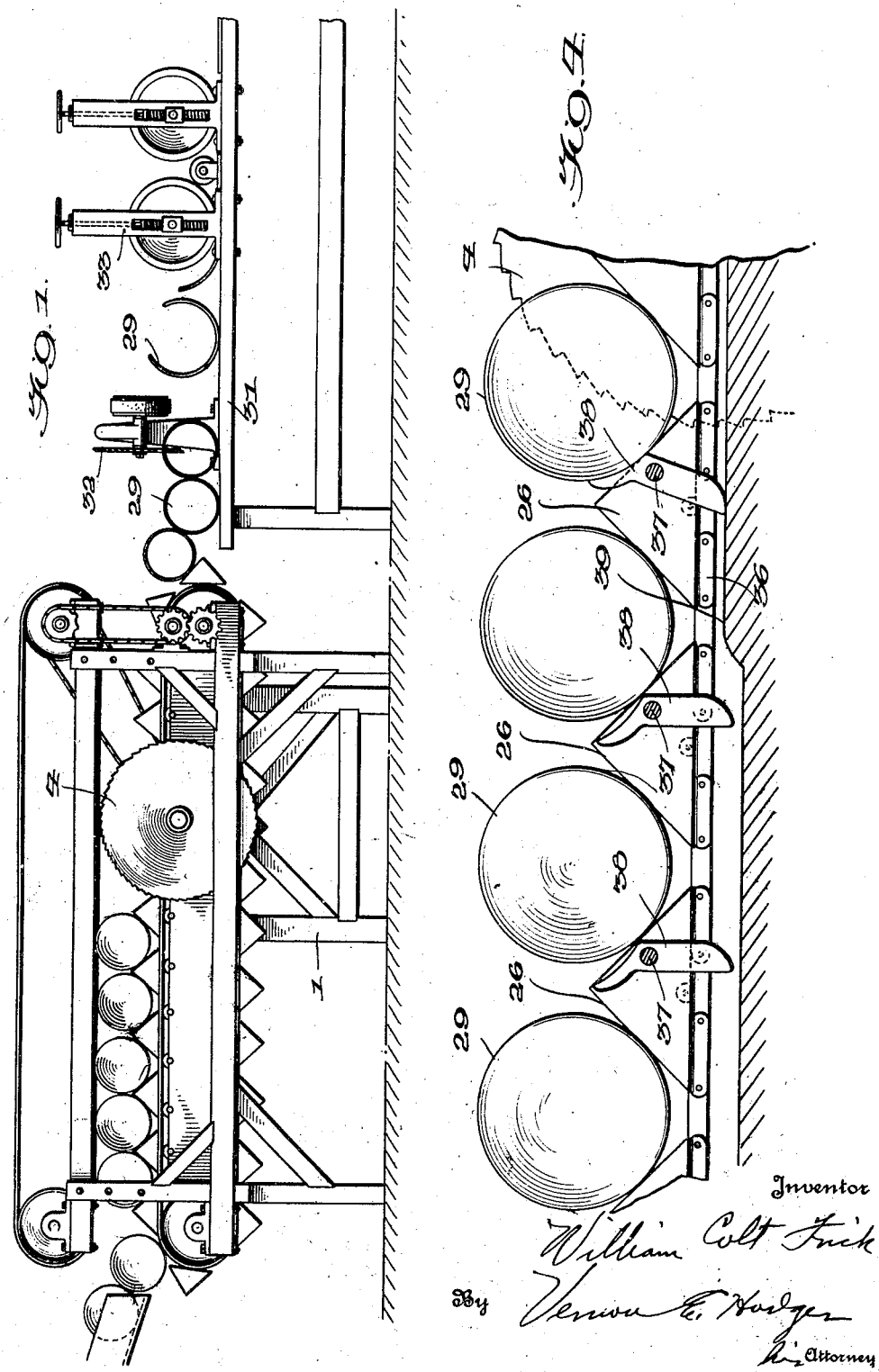

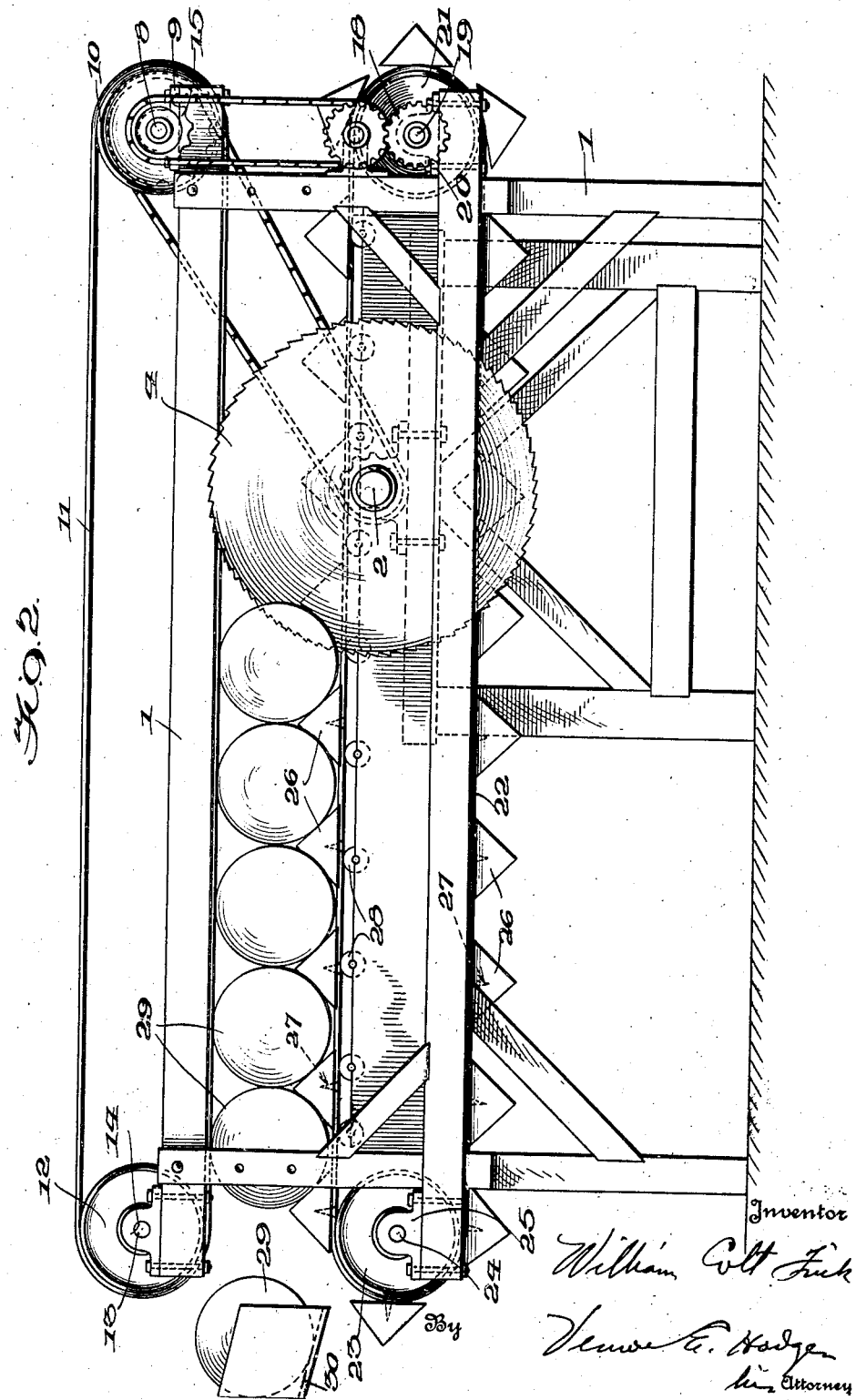

June 3, 1930.  W. C. FRICK  1,761,984
MECHANISM FOR SALVAGING TIN CANS
Filed April 4, 1927  3 Sheets-Sheet 3
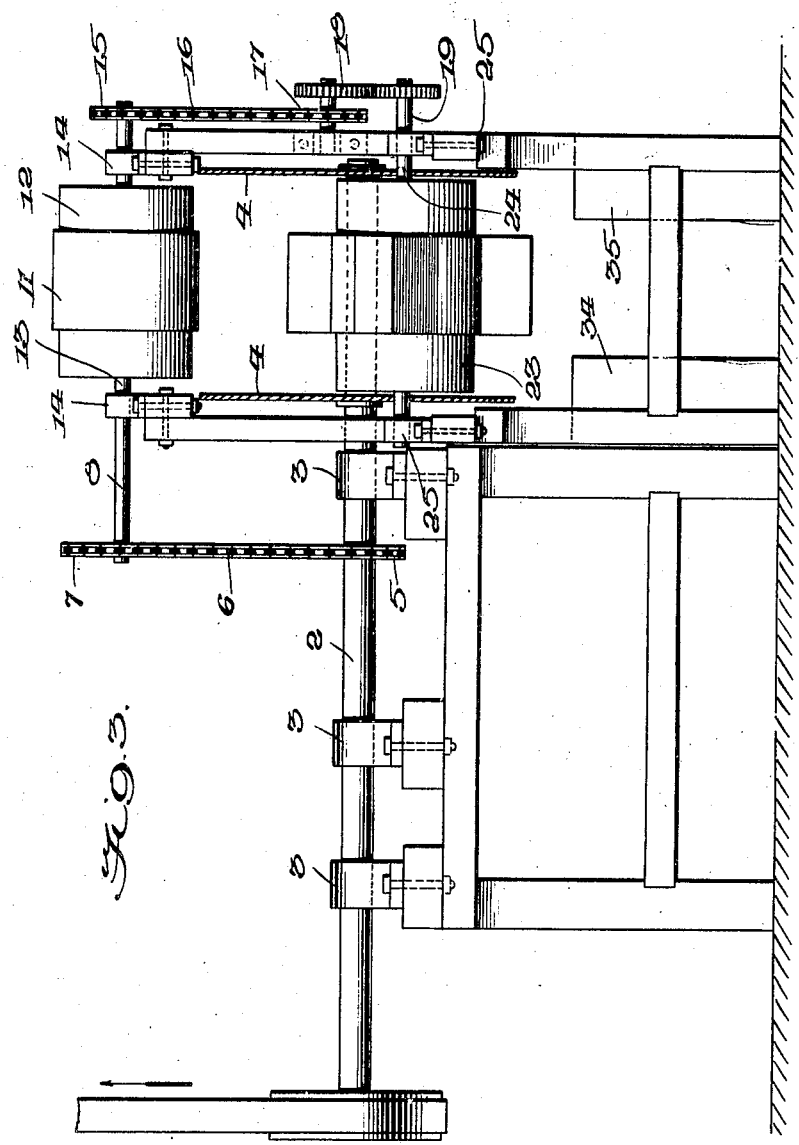

Patented June 3, 1930

1,761,984

UNITED STATES PATENT OFFICE

WILLIAM COLT FRICK, OF DANVILLE, PENNSYLVANIA; MARY E. FRICK ADMINISTRATRIX OF SAID WILLIAM COLT FRICK, DECEASED

MECHANISM FOR SALVAGING TIN CANS

Application filed April 4, 1927. Serial No. 180,983.

This invention relates to a mechanism for for salvaging tin cans.

The object of the invention is to restore used tin cans to their original condition in the form of metal plates which may be used for making other tin cans or cans of smaller sizes. At the present time, the metal in used tin cans is practically wasted, because the only way for using it is to bale the cans and melt them up into sash-weights or similar inexpensive castings. The cost of collecting the tin cans and re-working them into such cheap castings is almost half of the proceeds realized from the resultant metal.

With the use of the present invention, the metal in the cans may be saved and used over again in making other tin cans, which renders the savings from such salvaging operation a great deal more than could be realized where the cans are melted and made into sash-weights or similar inexpensive castings. With the exception of perhaps one or both ends, the entire metal in the can is used for other cans which does not reduce it to the inexpensive metal obtained if the can should be melted as described above.

Another reason for salvaging the metal in tin cans for use in making other tin cans is the continually increasing scarcity of tin, and, unless preserved, the supply of tin throughout the world will become so nearly exhausted as to render it necessary to use some other material for containing various articles or goods which are now packed in tin cans.

With the present invention, the salvaging of the metal in tin cans is accomplished by sawing off one or both ends of the can, then also sawing through the remaining cylinder on both sides of the seam and flattening out the metal strip, forming the cylinder into a plate form. The cans are originally made or formed from plates, and consequently when the cylindrical can has been reduced to a plate, this may be utilized for making another can of perhaps a smaller size. In this way, the metal is substantially all saved and utilized in the same way as the original metal, which does not in any manner reduce its value. It is possible also to use at least one of the ends for closing an original can again, and thus save that amount of tin also. The apparatus for carrying out this method may be of a variety of forms, but is preferably in the form of an endless conveyer which receives and carries the cans forward to a saw or saws for sawing off the ends, after which the cans are discharged on to a table where a saw or shears may be used for slitting the cylinder, and any suitable means may flatten out the sheet of tin which forms the cylinder.

In the accompanying drawings:

Fig. 1 is a side elevation of a form of the complete mechanism;

Fig. 2 is a side elevation of the mechanism for removing the ends of the cans;

Fig. 3 is an end view of the same;

Fig. 4 is a detail sectional view of a part of the conveyor of a general type, as is shown in Fig. 1.

As shown in the drawings, the supporting frame-work is designated by the numeral 1, upon which the main drive-shaft 2 is mounted in suitable brackets 3 fixed on the frame. This drive-shaft 2 may be driven in any suitable manner by means of a suitable motor (not shown). Saws 4 are fixed on the main drive-shaft 2 on the opposite sides of the frame.

A sprocket-wheel 5 is fixed on the drive-shaft 2, and receives a sprocket-chain 6 thereover, as shown in Figs. 2 and 3, which also passes over a sprocket-wheel 7 fixed on a belt-shaft 8 mounted in suitable bearings 9 fixed on the frame. A pulley 10 is also mounted on this shaft 8 and receives a belt 11, which passes over a similar pulley 12 at the opposite end of the frame which is fixed on a shaft 13 likewise mounted in bearings 14 on the frame.

A sprocket-wheel 15 is mounted on the opposite end of the shaft 8 from the sprocket-wheel 7, and a sprocket-chain 16 passes over the sprocket-wheel 15, and another sprocket-wheel 17 which is connected by the gearing 18 to the shaft 19 mounted below the shaft 8 in bearings 20. A pulley 21 is fixed on the shaft 19 and receives and supports a belt conveyer 22 which passes around a similar pulley 23 mounted on a shaft 24 fixed in bearings 25 at the opposite end of the frame and beneath the pulley 12. Arranged in spaced-apart relation on the conveyer 22 are a plurality of blocks 26 secured thereon by suitable screws or similar means 27.

At its upper side, the conveyer 22 is supported by small rollers 28 carried in the frame for supporting said conveyer during its passage along the frame. The cans designated by the numeral 29 are fed continuously down a conveyer 30, from where they roll into the spaces between the blocks 26 and pass beneath the belt 11 which holds them down in their proper positions on the conveyer 22. This conveyer carries them along the frame to the saws 4 which cut off the opposite ends of the cans, and they are discharged by the conveyer 22 onto a table 31.

An operator arranges the cans with the seams uppermost and feeds them through a small saw 32, which slits the cylinder of each can on one side of the seam, after which they are passed through suitable mechanism designated generally by the numeral 33 for cutting off the seam. This leaves the flat plates in a form similar to the plates from which the original can was made, and allows them to be made over again into other cans. Since these plates are slightly smaller than the size of the original plates, it is obvious that they would be made into smaller-sized cans. However, the original bottom of the can which has been sawed off might be salvaged and used to form the bottom of a new can instead of being destroyed or otherwise used in any other manner.

Chutes 34 and 35 are arranged beneath the saws 4 for receiving the sawed ends of the cans as they are sawed off, and these chutes may convey the ends to any desired location.

As shown in Fig. 4, endless chains 36 may be used to support the blocks 26, said chains passing over suitable sprocket-wheels instead of pulleys shown in Fig. 2. The middle of the blocks 26 may be reduced to a rounded portion 37, on which dogs 38 are pivotally mounted, and having the free ends thereof normally suspended beneath the conveyer for engaging a cam-plate 39, which swings the curved ends of the dogs up into contact with the sides of the cans for holding the cans in their proper positions on the conveyer during the sawing operation. If this form of conveyer is used, it is not required that the belt 11 be used, but may be, if desired.

It is obvious therefore that the present invention may be used to salvage the metal in used tin cans, which may not be re-used for containing food, but which may be re-made in accordance with the present invention into other tin cans, and these not being the originals, could be used for food products. This saves the metal without decreasing its value and at a very small cost.

I claim:

1. A can cutting machine of the character described including a frame, a main drive-shaft carried thereby, saws mounted on said drive-shaft in spaced-apart relation, an endless conveyer carried by the frame and driven from said drive-shaft, said conveyer being arranged between the saws for delivering cans thereto to saw off the ends thereof, and means for feeding the cans to said conveyer.

2. A can cutting machine of the character described including a supporting frame, a main drive-shaft mounted thereon, saws fixed on said drive-shaft in spaced-apart relation, an endless conveyer connected with, and driven by, said drive-shaft, said conveyer being arranged between the saws for delivering tin cans thereto to saw off the opposite ends thereof, means for delivering cans to the conveyer, means for supporting the conveyer during its movement along the frame, and means for holding the cans against displacement on the conveyer during the sawing action.

3. In a machine of the character described, the combination with a drive shaft having saws mounted thereon in spaced apart relation, an endless conveyor associated with said saws for feeding cans thereto, and an endless belt arranged in cooperative relation with the endless conveyor for holding the cans thereon during the sawing operation.

4. In a machine of the character described, the combination with a drive shaft having saws mounted thereon in spaced apart relation, an endless conveyor associated with said saws for feeding cans thereto, an endless belt arranged in cooperative relation with the endless conveyor for holding the cans thereon during the sawing operation, and dogs connected with the conveyor in position to engage the cans during the sawing operation.

5. In a machine for salvaging tin cans, the combination with severing means for the cans, an endless conveyor for feeding the cans thereto, dogs connected with said conveyor for frictionally embracing the back sides of the cans and holding the same against the severing means during the severing operation, and means for automatically causing the movement of the dogs into embracing engagement with the cans when the cans reach a predetermined position relative to the severing means.

In testimony whereof I affix my signature.

WILLIAM COLT FRICK.